Figure 1:
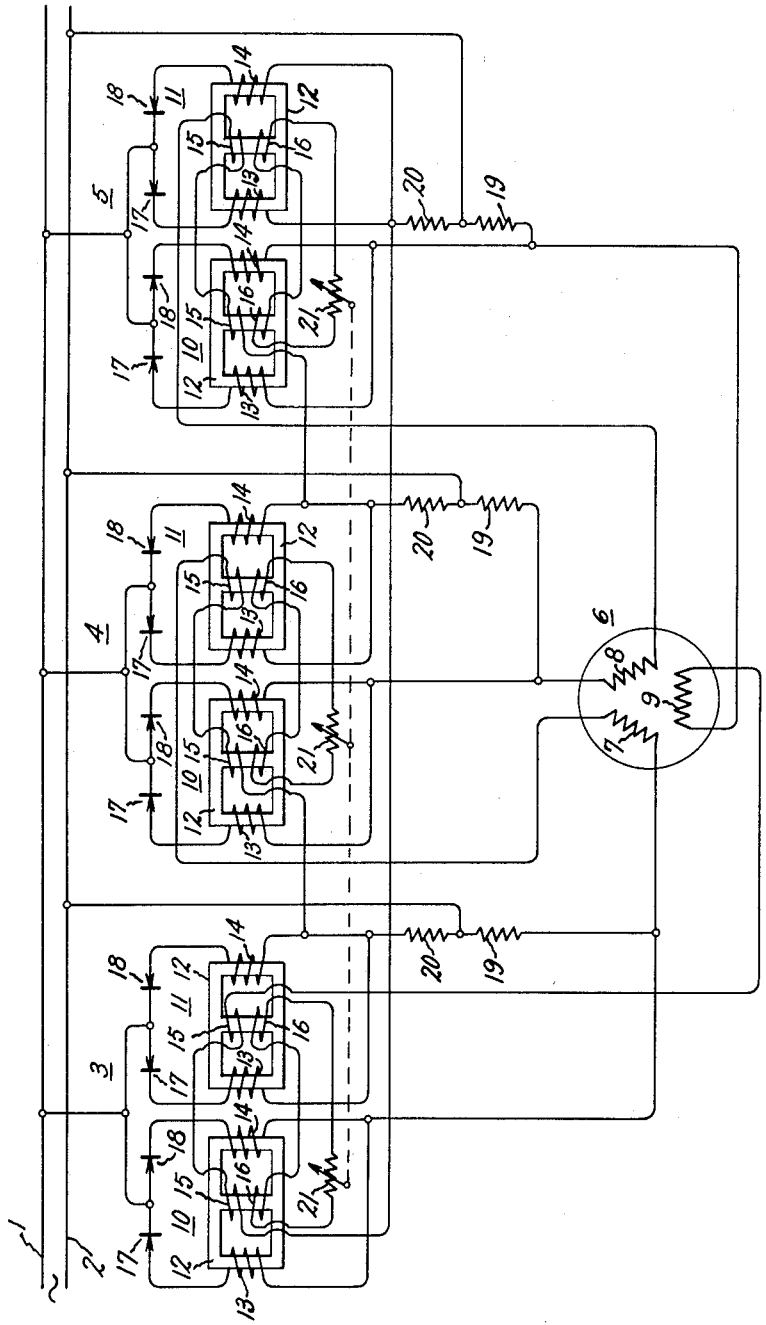

Dec. 13, 1955          H. M. OGLE          2,727,199

VARIABLE FREQUENCY POWER CONTROL SYSTEMS FOR A. C. MOTORS

Filed May 18, 1953          2 Sheets-Sheet 1

Inventor:
Hugh M. Ogle,
by    Paul A. Frank
His Attorney.

Dec. 13, 1955    H. M. OGLE    2,727,199
VARIABLE FREQUENCY POWER CONTROL SYSTEMS FOR A. C. MOTORS
Filed May 18, 1953    2 Sheets-Sheet 2

Inventor:
Hugh M. Ogle,
by Paul A. Frank
His Attorney.

United States Patent Office 2,727,199
Patented Dec. 13, 1955

2,727,199

VARIABLE FREQUENCY POWER CONTROL SYSTEMS FOR A. C. MOTORS

Hugh M. Ogle, Schenectady, N. Y., assignor to General Electric Company, a corporation of New York Application May 18, 1953, Serial No. 355,427

12 Claims. (Cl. 318—231)

My invention relates to systems for supplying polyphase alternating currents and controlling the frequency thereof.

For many installations where a variable speed drive is required polyphase induction motors offer advantages in so far as no commutators are required, the structure is compact, and maintenance is very low. While the speed can be controlled by varying the frequency of the line voltage, both three phase power and means for varying the power supply frequency are sometimes not available. In addition, variable frequency polyphase power supplies for motors or other purposes usually require auxiliary rotating machinery with attendant increase in maintenance, spark hazard, and space requirements.

It is therefore an object of my invention to provide a system for supplying adjustable frequency polyphase power from a single phase power source.

It is another object of my invention to provide a static apparatus for furnishing polyphase power.

It is a further object of my invention to provide a magnetic amplifier controlled induction motor variable speed drive.

In accordance with a feature of my invention, a plurality of magnetic amplifier stages energized from a single phase source are coupled in a loop or closed ring and the phase of each amplifier stage is shifted by a given amount to establish the frequency at which the amplifier ring will oscillate. In a preferred embodiment self-saturating magnetic amplifiers having at least one auxiliary control winding in addition to the amplifier input control winding are preferably employed in the ring so that by connecting a variable impedance across each auxiliary winding the phase of each stage output current is shifted with respect to the output current of the preceding stage in the ring. The output current of each stage or a current derived therefrom is supplied separately to each phase circuit of a multiphase induction motor or other polyphase load so that by changing the auxiliary winding impedance the output frequency, and hence the motor speed, are controlled.

The novel features which I believe to be characteristic of my invention are set forth with particularity in the appended claims. The invention itself, however, both as to its organization and method of operation, together with further objects and advantages thereof, may best be understood by reference to the following description taken in connection with the accompanying drawing in which Fig. 1 is a schematic representation or circuit diagram of a frequency control system embodying my invention and Fig. 2 is a circuit diagram of a modification thereof.

Figure 2:
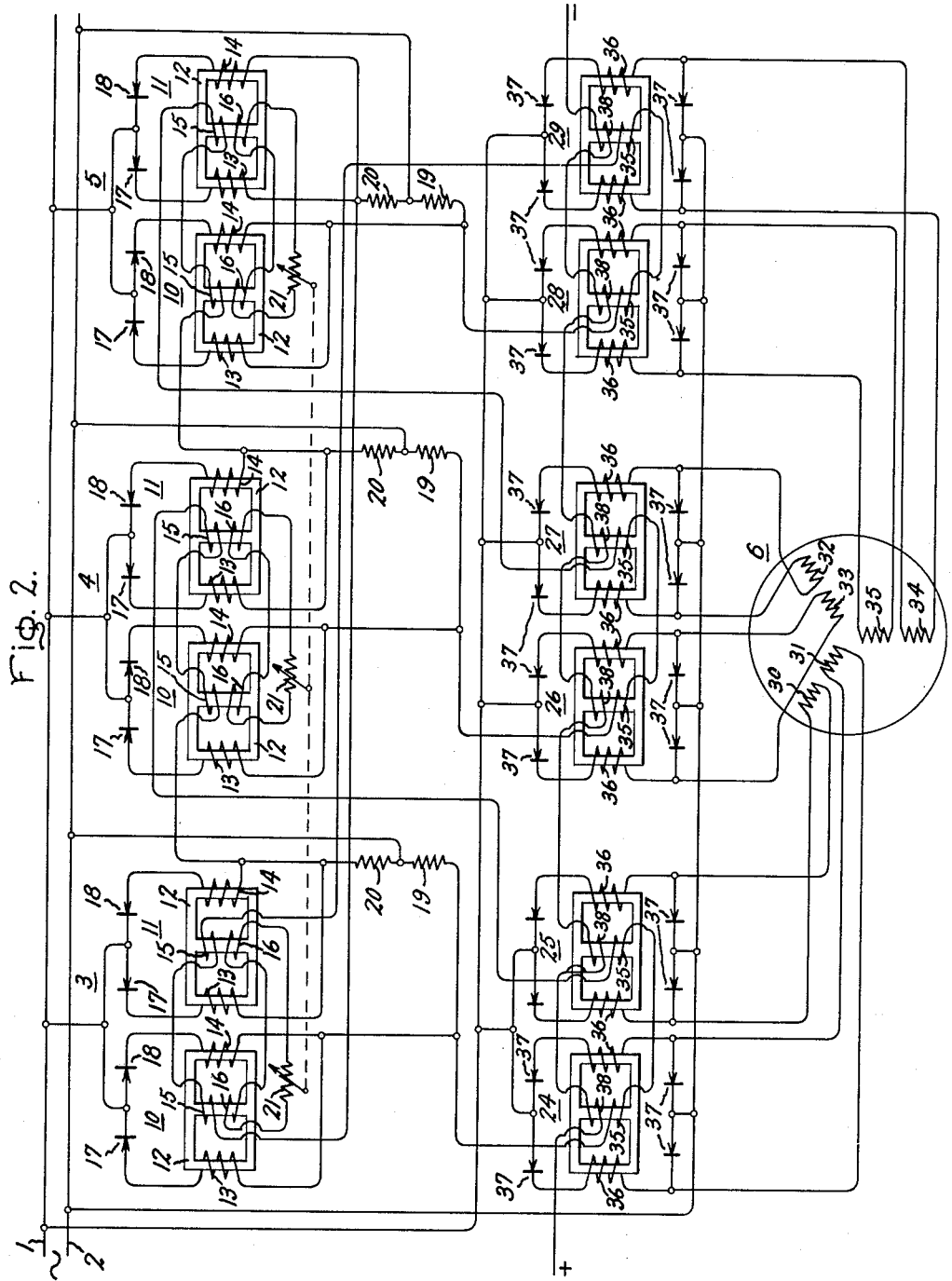

Referring now to Fig. 1 an induction motor variable speed drive is shown therein in which a source of single phase power represented by conductors 1 and 2 is employed to energize a magnetic amplifier power control circuit having three identical amplifying stages 3, 4, and 5, each preferably arranged for push-pull operation, connected in a closed loop or ring. A three-phase induction motor 6 has its stator phase windings 7, 8, and 9 independently connected in the respective output circuits of amplifier stages 3, 4 and 5. With the output signal of each amplifying stage in the ring shifted in phase with respect to the input signal by a given amount, oscillation occurs at the frequency for which the loop gain is unity and the loop phase shift is 180°. Since the three stages are the same, the gain of each stage is unity and the phase shift between them is 120° so that the three push-pull currents are available for application to three phase alternating current loads.

Since the amplifying stages are identical in themselves, reference is made to amplifier 10 which is one of the amplifiers 10 and 11 employed in push-pull relationship in amplifier stage 3 for an understanding of the operation of the ring oscillator. Accordingly, it may be seen that the magnetic amplifier unit 10 shown in Fig. 1 is of the self-saturating type having a closed three-legged magnetic core 12 which is preferably of a material having a relatively high permeability. On the outer legs of the core are located load windings 13 and 14 respectively, while the center leg is provided with two control windings 15 and 16. The load windings are arranged on the core legs so that the unidirectional components of magnetic flux produced by a current in the windings have the same direction in the common core leg linked by the control windings. One end of load winding 13 is connected through a rectifier 17 to supply line 1, and the corresponding end of load winding 14 is connected to the same line through an oppositely connected rectifier 18. The other ends of the load windings 13 and 14 are connected to resistor 19 which, together with a similar serially-connected resistor 20, comprises a push-pull output impedance. The load windings of the other amplifier 11 in the push-pull stage 3 are similarly connected through opposed rectifiers to alternating current supply line 1 and the other ends of their windings are connected to the other resistor 20 of the push-pull output load. The common connection of the output resistor is returned to the other line 2 of the single phase voltage power source.

Referring briefly to the operation of the magnetic amplifiers as connected for push-pull operation, assume for the moment that the control windings are not energized. Under these circumstances with the load windings connected as shown assume there is no flux in the core at the instant that the voltage wave of the alternating current supply is zero. As the voltage increases and begins a positive half cycle the current in one load winding, for example the winding 13 of core 12, produces flux which increases with the voltage until the saturation point is reached whereupon substantially all of the voltage drop between the supply lines occurs across the push-pull output resistor 19. When the saturation point is reached the core no longer affects the reactance of the load winding and the current through the winding lags slightly behind the phase of the applied voltage as this voltage returns to zero at the end of the positive half cycle. The rectifier 17 then stops the reversal of the current and the next half cycle the same process repeats itself in the load winding 14. Accordingly during both half cycles of a full wave of applied voltage two current pulses in opposite directions are produced in the output resistor 19. The other amplifier unit 11 is connected in opposite polarity for push-pull operation, and hence for a full wave of applied voltage two current pulses in opposite directions are produced in the other output resistor 20. The average developed voltage across the push-pull load 16 will therefore be approximately zero under the assumed condition of zero control current. Because of the push-pull connection, no critical biasing means are required to compensate for changes in line voltage.

It will be readily understood that when the control windings 15, which may also be termed the amplifier input windings, are energized, the point during each voltage half cycle at which the magnetic core saturates is changed, and by connecting each input winding 15 so that it opposes the flux produced in the center leg by the load windings, the core saturates at a later point during each half cycle. This reduces the interval during which a load winding can conduct a substantial current and as a result reduces the average load current. To provide the control current, the windings 15 of each set of push-pull connected amplifier units are connected in series with each other and with a motor phase winding or other desired load impedance across the push-pull output resistors 19 and 20 of the next preceding amplifier stage. Conventional filter means may also be incorporated in the input circuit to modify harmonic effects of the power supply frequency.

The ring oscillator frequency therefore must increase or decrease to reach the point of stable operation in accordance with the shift in phase between the input and output currents of each stage. This phase shift is controlled in accordance with my invention by simply connecting a variable resistor 21 or other suitable impedance across each control or phase shift winding 16. As shown in Fig. 1 the phase shift windings 16 of each pair of cores in a push-pull stage are connected in series with each other and the adjustable resistor connected across the windings is mechanically linked to the corresponding resistors for gang tuning. No current source need be connected in series with the windings 16. The effect of the reactance or time delay in the firing of each magnetic amplifier unit caused by the linkage of the central core leg with the closed auxiliary winding is to shift the phase of each amplifier output current. This shift, added to the substantially 180° phase shift which is obtainable by reversing or crossing the coupling between stages, is sufficient to control oscillation over a range of frequencies.

With each of the phase windings 7, 8, and 9, of the induction motor 6, independently connected in the output circuit of each amplifier stage, the motor is thus energized by a three-phase power supply whose frequency is determined by controlling the resistance of the ganged resistors 21. Since the wave shape of the applied power departs substantially from a sine wave form the rating of the motor must be accordingly selected and with a three-phase induction or synchronous motor employed as the load, speed control is conveniently obtained. In some installations it may also be desirable to provide additional amplifiers in the ring for greater phase shift control, in which case each amplifying stage corresponding to one phase of the load will contain several cascaded amplifiers. Of course, for polyphase loads having more than three phases, the number of ring oscillator amplifying stages is proportionately increased.

Referring now to Fig. 2, another variable speed induction motor drive incorporating my invention is shown in which magnetic amplifiers are employed for power amplification of the three phase ring oscillator output currents. A single phase power source indicated by lines 1 and 2 and magnetic amplifiers 3, 4, and 5 connected as a ring oscillator are employed as in the circuit of Fig. 1. The push-pull output currents of the ring oscillator are employed as the respective control currents of three pairs of magnetic amplifiers 24 and 25, 26 and 27, and 28 and 29. This amplifying stage does not oscillate but instead provides power amplification.

As may be seen by reference to Fig. 2, each half of each of the three phase windings of the induction motor 6 is separately connected in the output circuit of one of the power amplifiers. Thus, the windings 30 and 31 of one of the phase windings are respectively connected as the output load circuits of the pair of amplifiers 24 and 25. Phase windings 32 and 33 and 34 and 35 are similarly connected as the output loads of amplifiers 26—29.

Referring to amplifier 24 for a more detailed understanding of the operation of it and the similar amplifiers in the power amplifying stage, amplifier 24 may suitably be of the general type described in connection with the embodiment of Fig. 1 and thus corresponding to the amplifiers employed in the ring oscillator stage of Fig. 2. The control windings 35 are connected in series with each other in the output circuit of amplifier 3 (which is also the input circuit of amplifier 4 of the ring oscillator). The two half-wave load windings 36 of each amplifier are connected with four rectifiers 37 in a bridge circuit with the load windings included in adjacent bridge arms. Two corners of the bridge are connected between power supply lines 1 and 2 and the load 30, which is half the turns of one of the phase windings, connected across the opposite corners.

The output currents of amplifier 24 and of 25 are each pulsating direct currents but the amplifier circuits are connected with respect to the windings 30 and 31 to provide magnetizing forces of opposite directions in the magnetic circuit of the induction motor. The effect is thus similar to placing a push-pull voltage across windings 30 and 31 connected in series except that by connecting the windings separately to separate amplifiers greater efficiency is obtained. Each amplifier should also be similarly biased to provide optimum gain and the same output current at zero input current. This bias is suitably provided by an auxiliary or bias control winding 38 connected on the center leg of each amplifier core, the windings 38 of each of the amplifiers in the power amplifier stage being suitably connected in series with a source of unidirectional bias current.

In the arrangement of Fig. 2, the relatively high efficiency of the power amplifier stage permits operation of relatively large motors together with the relative freedom from the effect of supply line voltage variations upon the phase shift control as provided by the push-pull stages of the ring amplifier. Additional stages of power amplification may also be employed if desired or the circuit may be arranged for multi-phase motors other than three phase. In either event, the first amplifier stage is allowed to oscillate and the oscillations are employed with their frequency determined by the adjustable phase shift means to drive the motor through the power amplifying stage or stages. For the type of amplifier construction and circuitry shown herein, however, direct current isolation of the phase windings of the load is required.

It is also obvious that other types of magnetic amplifier structures may be employed without departing from the spirit of my invention and that load devices other than induction motors may be substituted. Similarly, feedback control of the frequency with respect to the speed of the load may also be incorporated as is well-known in the art through the use of additional magnetic amplifier control windings.

While I have shown and described various specific embodiments of my invention it will of course be understood by those skilled in the art that various modifications may be made without departing from the principles of the invention. I therefore contemplate by the appended claims to cover any such modifications as fall within the true spirit and scope of my invention.

What I claim as new and desire to secure by Letters Patent of the United States is:

1. A variable frequency multiphase alternating current power supply comprising a ring oscillator, said ring oscillator including a plurality of amplifiers with each amplifier having its output stage coupled to the input stage of the succeeding amplifier in the ring, means for shifting the phase of each amplifier by a given amount whereby the oscillator frequency is controlled, means for connecting each of said amplifiers to a single phase alternating current source, and means for supplying the output current of each amplifier to a multiphase load.

2. A variable frequency multiphase alternating current power supply for a multiphase load which comprises a ring oscillator, said ring oscillator including a plurality of magnetic amplifiers corresponding to said plurality of phases with each amplifier having its output stage coupled to the input stage of the succeeding amplifier in the ring, means for shifting the phase of each amplifier by a given amount whereby the oscillator frequency is established, means for connecting each of said amplifiers to a single phase alternating current source, and means for supplying the output current of each amplifier to said load.

3. A variable frepuency three phase alternating current power supply which comprises a ring oscillator, said ring oscillator including a plurality of magnetic amplifiers corresponding to said plurality of phases with each amplifier having its output stage coupled to the input stage of the succeeding amplifier in the ring, means for shifting the phase of each amplifier by a given amount whereby the oscillator frequency is established, means for connecting each of said amplifiers to a single phase alternating current source, and means for supplying the output current of each amplifier to a three phase load device.

4. Means for varying the speed of a multiphase alternating current motor having a plurality of separate phase windings which comprises a ring oscillator, said ring oscillator including a plurality of magnetic amplifiers corresponding to said plurality of phases with each amplifier having its output stage coupled to the input stage of the succeeding amplifier in the ring, means for connecting each amplifier to a single phase alternating current source, means for shifting the phase of each amplifier by a given amount whereby the oscillator frequency is established, and means for coupling each amplifier output stage to one of said motor phase windings.

5. A variable speed motor drive comprising a three phase alternating current motor having a plurality of separate phase windings, a single phase alternating current power source, a ring oscillator including a plurality of magnetic amplifier stages corresponding to said plurality of phases energized by said source, each amplifier stage having its output circuit coupled to the input circuit of the succeeding amplifier in the ring, means for shifting the phase of each amplifier by a given amount whereby the oscillator frequency is controlled and means for coupling the output current of each amplifier output stage in circuit with said motor phase windings to operate said motor at a speed varying with said frequency.

6. A variable frequency power supply for a three phase load apparatus motor having a plurality of phase windings, a single phase alternating current power source, a ring oscillator including a plurality of alternating current magnetic amplifier stages corresponding to said plurality of phase windings energized by said source, each amplifier stage having an input control circuit and an output current circuit with the output circuit of each stage coupled to the input circuit of the succeeding stage in the ring, means for shifting the phase of each amplifier by a given amount whereby the oscillator frequency is controlled, and means for coupling the amplifier stage output circuits to the corresponding phase windings of said load device.

7. A variable speed motor drive comprising a three phase alternating current motor having a plurality of phase windings, a single phase alternating current power source, a ring oscillator including a plurality of alternating current magnetic amplifier stages corresponding to said plurality of phase windings energized by said source, each amplifier stage having an input control circuit and an output current circuit with the output circuit of each stage coupled to the input circuit of the succeeding stage in the ring, means for shifting the phase of each amplifier by a given amount whereby the oscillator frequency is controlled, and means for coupling the amplifier stage output circuits to the corresponding motor phase windings to operate said motor at a speed varying with said frequency.

8. In combination, a ring oscillator comprising a plurality of self-saturating magnetic amplifiers each of a type having a saturable magnetic core with at least one load winding and a first and second control winding positioned on said core, means connecting said amplifiers in circuit to provide at least three alternating current amplifying stages with the alternating output current of each stage supplied to the first control winding of another of said stages, means for energizing said load windings from a single phase alternating current source, impedance means connected in circuit with each of said second control windings to modify each amplifier stage phase shift and thereby establish the operating frequency of the ring oscillator, and means for separately supplying output current from said amplifier stages of said ring oscillator to a multiphase load apparatus.

9. In combination, a source of single phase alternating current, a ring oscillator comprising a plurality of self-saturating magnetic amplifiers each of a type having a saturable magnetic core with at least one load winding and a first and second control winding positioned on said core, means connecting said amplifiers in circuit to provide three alternating current amplifying stages with the alternating output current of each stage supplied to the first control winding of another of said stages, means for energizing said load windings from said source, impedance means connected in circuit with each of the second control windings to modify the amplifier phase shift and thereby establish the operating frequency of the ring oscillator, a multiphase alternating current load having phase circuits corresponding to each phase, and means for supplying output current from successive amplifier stages of said ring oscillator to successive phase circuits of said load.

10. In combination, a ring oscillator comprising a plurality of self-saturating magnetic amplifiers each of a type having a saturable magnetic core with at least one load winding and a first and second control winding positioned on said core, means connecting said amplifiers in circuit to provide three alternating current amplifying stages with the alternating output current of each stage supplied to the first control winding of another of said stages, means for energizing said load windings from a single phase alternating current source, impedance means connected in circuit with each of the second control windings to modify the amplifier phase shift and thereby establish the operating frequency of the ring oscillator, means for simultaneously adjusting each impedance means to vary the frequency, and means for supplying output current from each of said amplifier stages of said ring oscillator to a three phase load apparatus.

11. In combination, a source of single phase alternating current, a ring oscillator comprising a plurality of self-saturating magnetic amplifiers each of a type having a saturable magnetic core with at least one load winding and a first and second control winding positioned on said core, means connecting said amplifiers in circuit to provide three alternating push-pull current amplifying stages with the alternating output current of each stage supplied to a control current of the first control winding of another of said stages to provide a closed ring oscillator, means for energizing said load windings from said source, impedance means connected in circuit with each of the second control windings to modify the amplifier phase shift and thereby establish the operating frequency of the ring oscillator, means for varying each impedance means to vary the frequency, a three-phase alternating current motor having three separate phase windings, and means for supplying output current from each of the amplifier stages of said ring oscillator to each of said phase windings of said motor to provide an adjustable frequency supply current therefor.

12. In combination, a ring oscillator comprising a plurality of self-saturating magnetic amplifiers each of a type having a saturable magnetic core with at least one load winding and a first and second control winding positioned on said core, means connecting said amplifiers in circuit to provide three push-pull stages with the amplified alternating output current of each stage supplied to the first control winding of another of said stages, means for energizing said load windings from a single phase alternating current source, impedance means connected in circuit with each of the second control windings to modify the amplifier phase shift and thereby establish the operating frequency of the ring oscillator, means for simultaneously adjusting each impedance means to vary the frequency, a pair of magnetic amplifiers for amplifying the output current of each of said stages, and means for supplying output current from each of said pairs of magnetic amplifiers to a three phase load apparatus.

References Cited in the file of this patent

UNITED STATES PATENTS

| | | |
|---|---|---|
| 2,518,953 | Sorensen et al. | Aug. 15, 1950 |
| 2,567,383 | Krabbe et al. | Sept. 11, 1951 |
| 2,623,203 | De Muth | Dec. 23, 1952 |
| 2,644,127 | Bradley | June 30, 1953 |